(12) United States Patent
Stas

(10) Patent No.: US 10,772,444 B2
(45) Date of Patent: Sep. 15, 2020

(54) HANGING SYSTEM HAVING A HANGING RAIL AND MOUNTING CLIPS

(71) Applicant: STAS I.P. B.V., Eindhoven (NL)

(72) Inventor: Marinus Barbara Arnoldus Maria Stas, Hapert (NL)

(73) Assignee: STAS I.P. B.V., Eindhoven (NL)

( * ) Notice: Subject to any disclaimer, the term of this patent is extended or adjusted under 35 U.S.C. 154(b) by 0 days.

(21) Appl. No.: 16/374,758

(22) Filed: Apr. 4, 2019

(65) Prior Publication Data

US 2019/0307268 A1   Oct. 10, 2019

(30) Foreign Application Priority Data

Apr. 4, 2018 (NL) .................................... 2020716

(51) Int. Cl.
*A47G 1/16* (2006.01)
*A47G 1/22* (2006.01)
*F16M 13/02* (2006.01)
*A47H 1/144* (2006.01)

(52) U.S. Cl.
CPC ............. *A47G 1/1686* (2013.01); *A47G 1/22* (2013.01); *A47H 1/144* (2013.01); *F16M 13/02* (2013.01)

(58) Field of Classification Search
CPC ........ A47G 1/1686; A47G 1/22; A47H 1/144; F16M 13/02
See application file for complete search history.

(56) References Cited

U.S. PATENT DOCUMENTS

| 3,991,963 | A | | 11/1976 | Solo | |
| 4,300,745 | A | * | 11/1981 | Peterson | A47H 1/102 248/546 |
| 6,119,878 | A | * | 9/2000 | Zen | A47F 5/0846 211/57.1 |
| 7,757,869 | B2 | * | 7/2010 | Lawson | A47F 5/0846 211/59.1 |
| 8,844,886 | B2 | * | 9/2014 | Mejia | A47G 1/20 248/216.4 |
| 9,775,450 | B2 | * | 10/2017 | Will | A47G 1/20 |

(Continued)

FOREIGN PATENT DOCUMENTS

EP   2060209 A2 * 5/2009 ............... A47H 1/06
NL   1011935 C1   6/1999

OTHER PUBLICATIONS

European Search Report; Munich; dated Sep. 4, 2019.

*Primary Examiner* — Anita M King
(74) *Attorney, Agent, or Firm* — Patshegen IP LLC; Moshe Pinchas

(57) ABSTRACT

A hanging system has a hanging rail 3 and a number of mounting clips 1 for mounting the hanging rail 3 against a soft wall. Each mounting clip is formed from a flat plate 5 and is provided with a rear side 7 with which the mounting clip is in contact with the wall during use. Each mounting clip is provided with cams 11 and 13 protruding at the front 9. The hanging rail 3 is an extrusion profile of which a part 3*a* has a cross-section that is C-shaped and is provided with two spaced apart edge parts 15 and 17. The top edge part 15 hooks behind the top cam 11 and the bottom edge part 17 is clicked over the bottom cam 13. Each clip is furthermore provided with two bent nails 19 which protrude at the rear side 7 and which can be pressed into the soft wall, wherein parts 9*b* of the front form pressure surfaces.

6 Claims, 5 Drawing Sheets

(56) References Cited

U.S. PATENT DOCUMENTS 10,539,266 B2 * 1/2020 Will ........................ A47G 1/20
2007/0235622 A1 * 10/2007 Baran .................. A47B 96/027
248/546

* cited by examiner

HANGING SYSTEM HAVING A HANGING RAIL AND MOUNTING CLIPS

TECHNICAL FIELD OF THE INVENTION

The invention relates to a hanging system comprising at least two mounting clips for mounting against a wall, as well as a hanging rail which can be coupled to the mounting clips, said mounting clips each having a rear side with which the mounting clips are in contact with the wall during use, as well as a front side which is opposite the rear side, which mounting clips are each provided with two cams protruding from the front side, which hanging rail is provided with two spaced apart and opposite edge parts which can be hooked behind one of the cams of each mounting clip and can be clicked over the other cam of each mounting clip or can be clicked over both cams.

BACKGROUND OF THE INVENTION

A hanging system according to the preamble of claim 1 is known from NL1011935A. In this known hanging system, the mounting clips are made of plastic and have a hole through which they can be screwed against a wall.

The hanging rail must be mounted in a straight line against a wall with various mounting clips. Hanging cords or hanging rods can be fitted in the hanging rail to suspend objects without having to make holes in the wall.

SUMMARY OF THE INVENTION

An object of the invention is to provide a hanging system of the type described in the preamble which can be fastened more quickly to a soft wall. To this end, the hanging system according to the invention is characterized in that the mounting clips further each are provided with at least one nail protruding at the rear, which nail can be pressed into the wall, parts of the front of the mounting clips on either side of the nail form pressing surfaces, and that the mounting clips are each formed from a flat metal plate, the cams and the nail being formed by plate parts bent out of the plate, from the plate to be mounted against the wall the lower cam first extending away from the upper cam and then running towards the upper cam, the part extending towards the upper cam forms a guide for the lower edge part of the hanging rail for guiding this edge part over the cam when the hanging rail clicks on the mounting clip. The mounting clips can be pressed into the wall by hand or hammered by a hammer, after which the rail can simply be clicked onto the mounting clips by hand. The nail can be provided with barbs to prevent it from undesirably becoming detached from the wall.

It is to be noticed that US2007/0235622A discloses a hanging hook formed from a metal plate provided with a nail bent out of the plate, which nail can be pressed into a wall. This hook is not suitable for mounting a hanging rail against a wall.

In order to compensate for tolerances between the mounting rail and the mounting clips and to prevent the mounting rail from shifting with respect to the mounting clips during use, an embodiment of the mounting system according to the invention is characterized in that one of the cams is provided with a sharp protrusion on the side remote from the other cam and near the part of the cam attached to the plate, which protrusion is in contact with the lower edge part of the hanging rail when the hanging rail is on the mounting clip.

In a favorable manner for applying the sharp protrusion, the plate part is locally punched with a pointed tool.

A favorable embodiment of the hanging system according to the invention is characterized in that the hanging system comprises a pressing tool which can be placed on the mounting clip and is provided with contact parts on the side facing the mounting clip, which contact parts are in contact with the pressing surfaces of the mounting clip and on the side remote from the mounting clip the pressing tool is provided with two further pressing surfaces that are larger than the pressing surfaces of the mounting clip.

The pressure surfaces of the mounting clips are preferably flat and free from protrusions so that one can press well against them. The further pressing surfaces of the pressing tool are preferably hollow curved surfaces so that they can be pressed well with the thumbs.

BRIEF DESCRIPTION OF THE DRAWINGS

The invention will be explained in more detail below with reference to exemplary embodiments of the hanging system according to the invention shown in the drawings. Hereby shows.

DETAILED DESCRIPTION OF THE DRAWINGS

Figure 1:
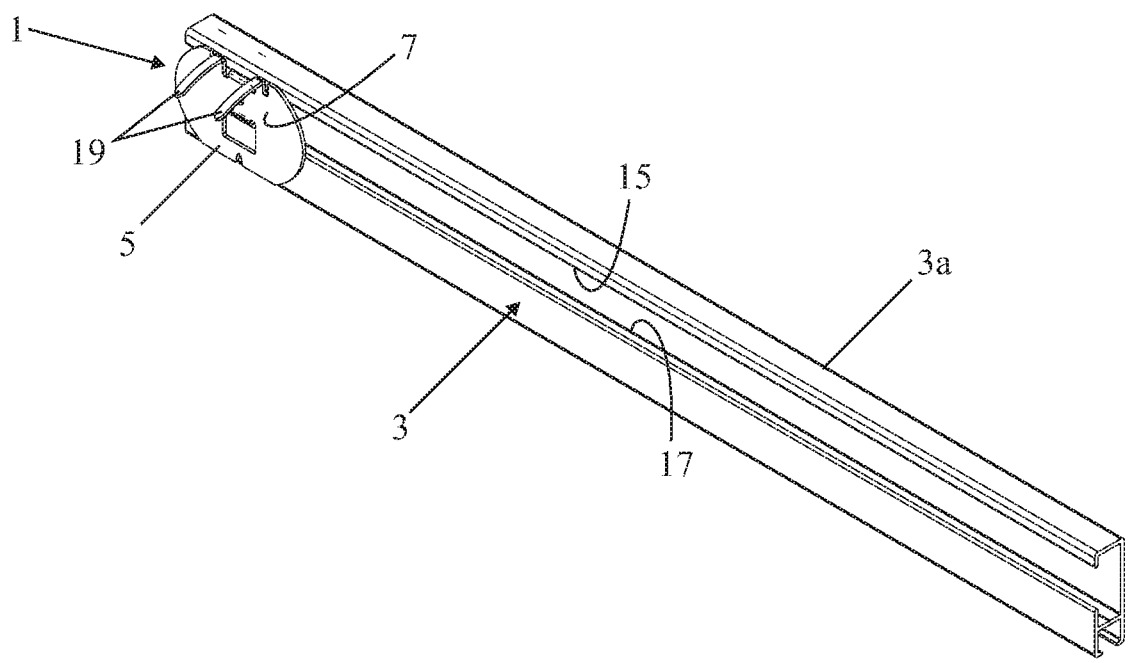
FIG. 1 shows a first embodiment of the hanging system according to the invention.
Figure 2:
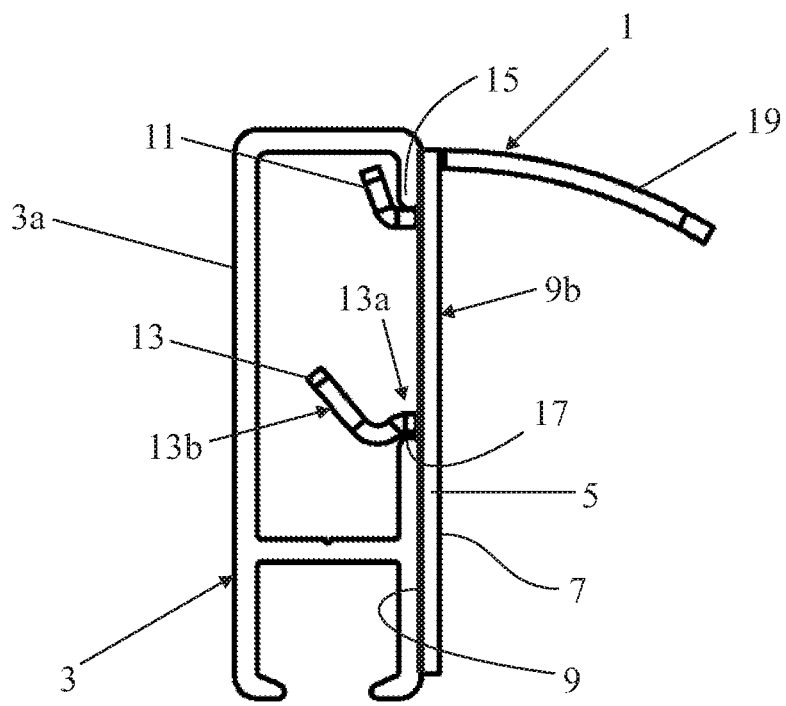
FIG. 2 shows the hanging system shown in FIG. 1 in cross section.

FIGS. 1 and 2 show a first embodiment of the hanging system according to the invention in perspective and cross-section, respectively. The hanging system has a number of mounting clips 1 for mounting against a wall, one of which is shown. Furthermore, the hanging system has a number of hanging rails 3 one of which is also shown. Each hanging rail is fastened to a wall with two or more mounting clips. Each mounting clip is formed from a flat plate 5 and is provided with a rear side 7 with which the mounting clip is against the wall during use and a front side 9 opposite to the rear side. Each mounting clip is provided with cams 11 and 13 protruding at the front side.

Each hanging rail 3 is an extrusion profile with a cross-section that is the same throughout its length. A part 3*a* of the cross-section is C-shaped and is provided with two spaced apart edge parts 15 and 17. The top edge part 15 hooks behind the top cam 11 and the bottom edge part 17 is clicked over the bottom cam 13. Each clip is furthermore provided with two bent nails 19 protruding at the rear 7 and which can be pressed into the soft wall (plasterboard or wood), whereby parts 9*b* of the front form pressing surfaces. The nails 19 are also bent out of the plane of the plate 5.

The cams 11 and 13 are formed by lips bent out of the plane of the plate 5 and protruding from the front side 9, one of the lips 11 being bent into a hook and of the other lip 13 a first part 13a is obliquely inclined with respect to the front side and a second part 13b is obliquely inclined with respect to the front side and is oppositely directed to the first part, see FIG. 2. When the rail is clicked onto the mounting clip, the rail first is hung with the upper edge part 15 in the upper cam 11 and then the lower edge part 17 is pressed over the second obliquely extending part 13b of the lower cam 13, the two edge parts being bent slightly elastic from each other to subsequently spring back again when the lower edge part 17 slides over the first part 13a.

Figure 3:
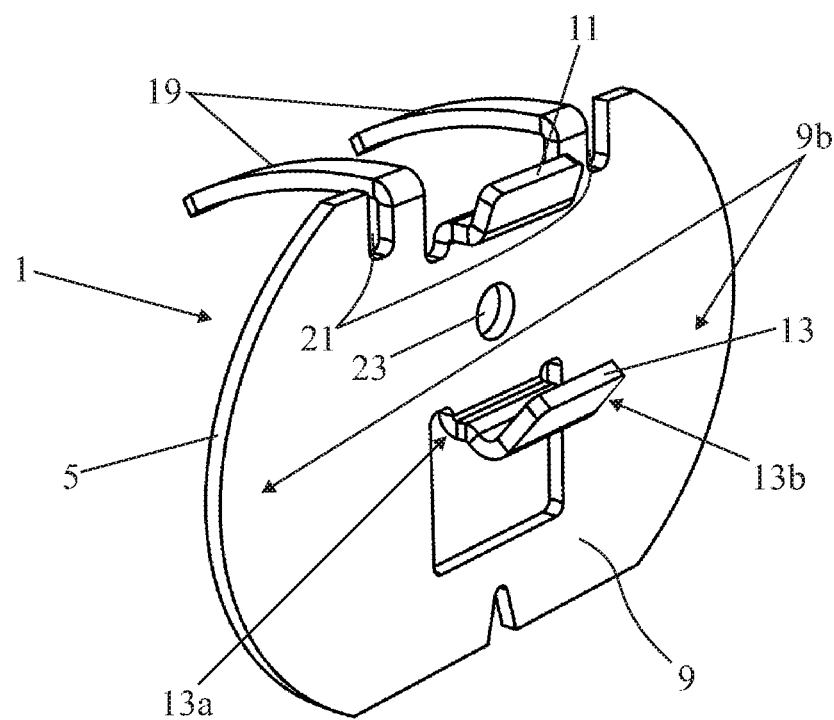
FIG. 3 shows a separate mounting clip of the hanging system shown in FIGS. 1 and 2 viewed from the front.
Figure 4:
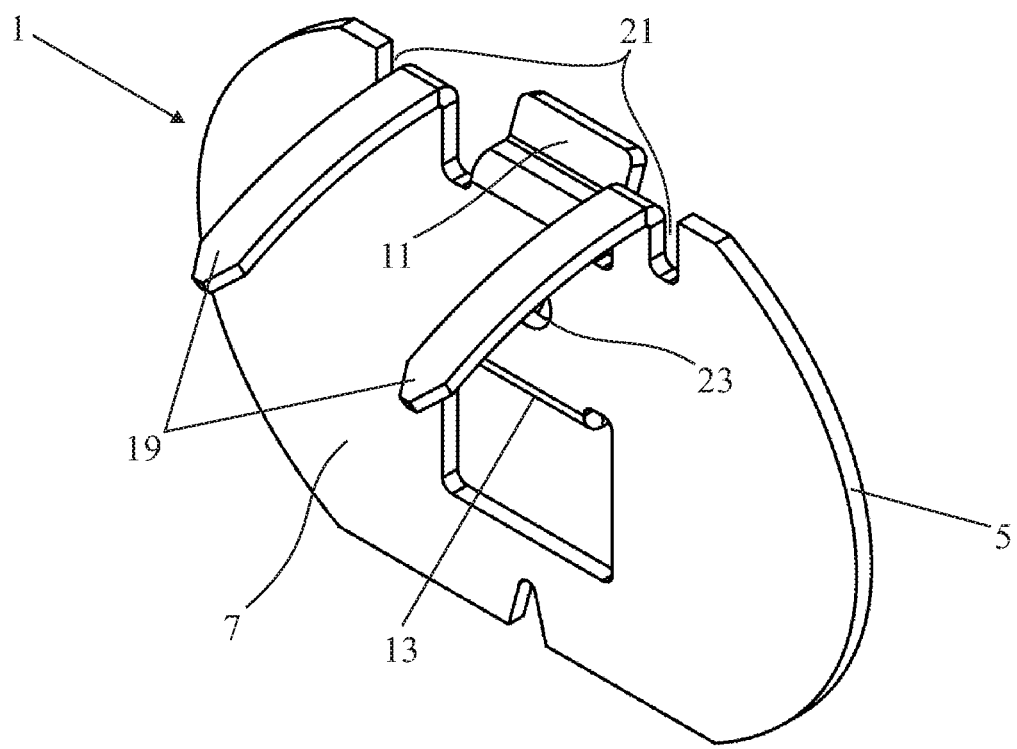
FIG. 4 shows the mounting clip shown in FIG. 3 viewed from behind.

FIGS. 3 and 4 show a separate mounting clip in perspective when viewed from the front and from the rear, respectively. The pressure surfaces 9b are flat and free from protrusions. Furthermore, slots 21 are provided in the mounting clip for hooking in a cord or elastic. Furthermore, a hole 23 is present in the mounting clip in the middle between the two nails, into which a pressing object can be inserted with a point to prevent it from slipping away during pressing.

Figure 5:
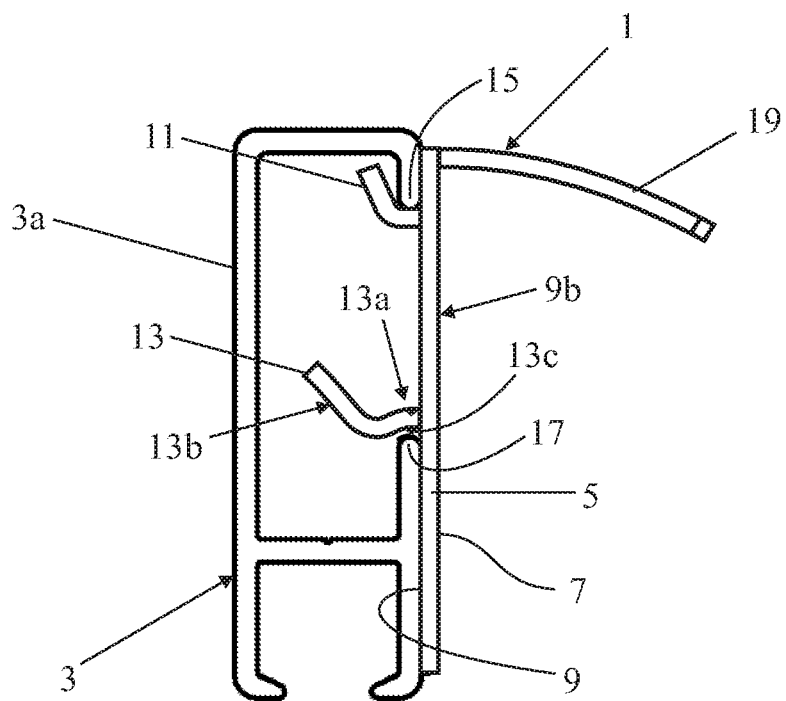
FIG. 5 shows a second embodiment of the hanging system according to the invention in cross-section.
Figure 6:
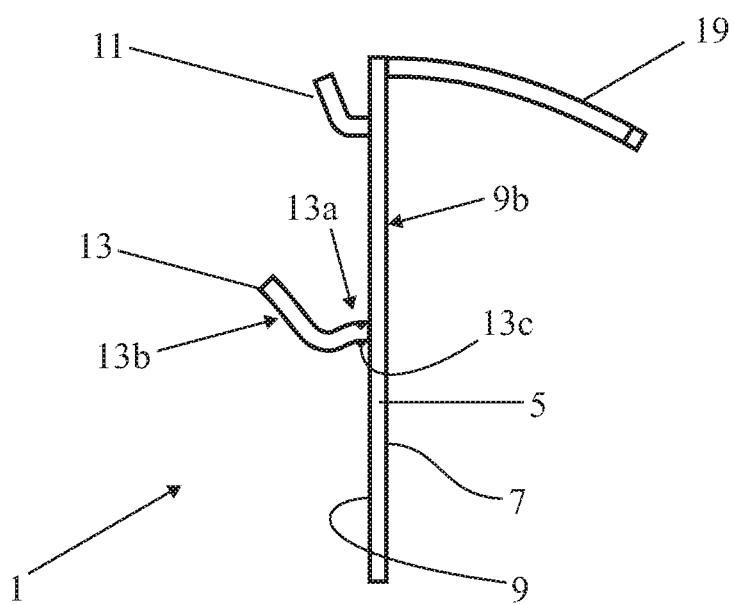
FIG. 6 is a side view of the mounting clip of the hanging system shown in FIG. 5.

FIGS. 5 and 6 show a second embodiment of the hanging system according to the invention. The hanging rail 3 is identical to that of the first embodiment described above and the mounting clip 1 only differs from that of the first embodiment in that the lower cam 13 is provided on the side remote from the upper cam 11 with a sharp protrusion 13c near the part of the cam attached to the plate 5. This protrusion 13c is intended to compensate for any play between the cams of the mounting clip and the edge parts of the hanging rail as a result of production tolerances. The protrusion 13c is in contact with the lower edge part 17 of the hanging rail 3 when the rail 3 is clicked onto the mounting clip and prevents the mounting rail from sliding relative to the mounting clip during use. The protrusion 13c is formed by locally pressing the plate part with a pointed tool.

Figure 7:
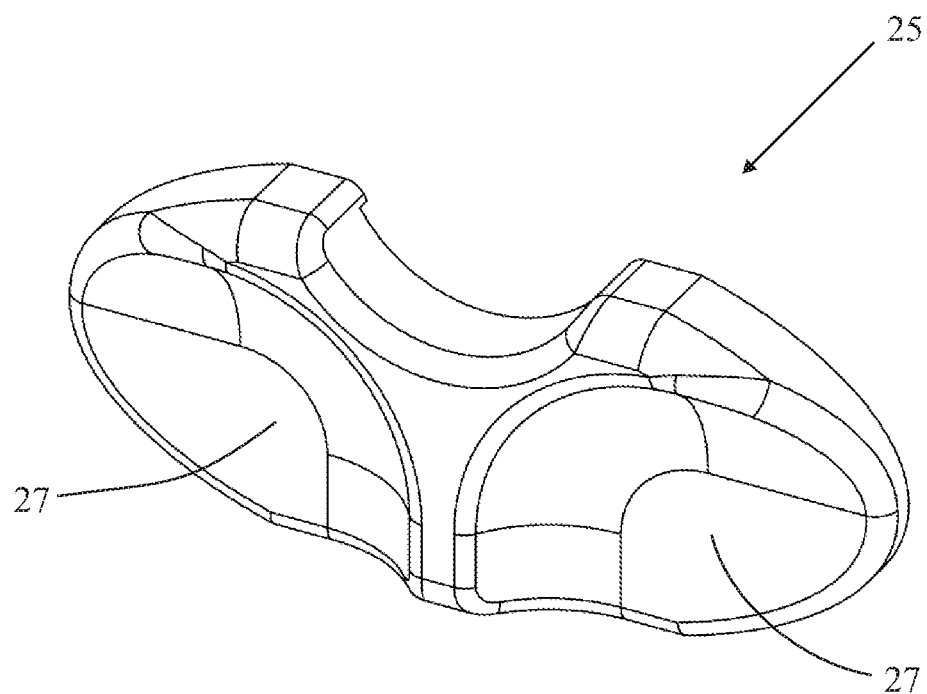
FIG. 7 shows the pressure attachment of the hanging system according to the invention.
Figure 8:
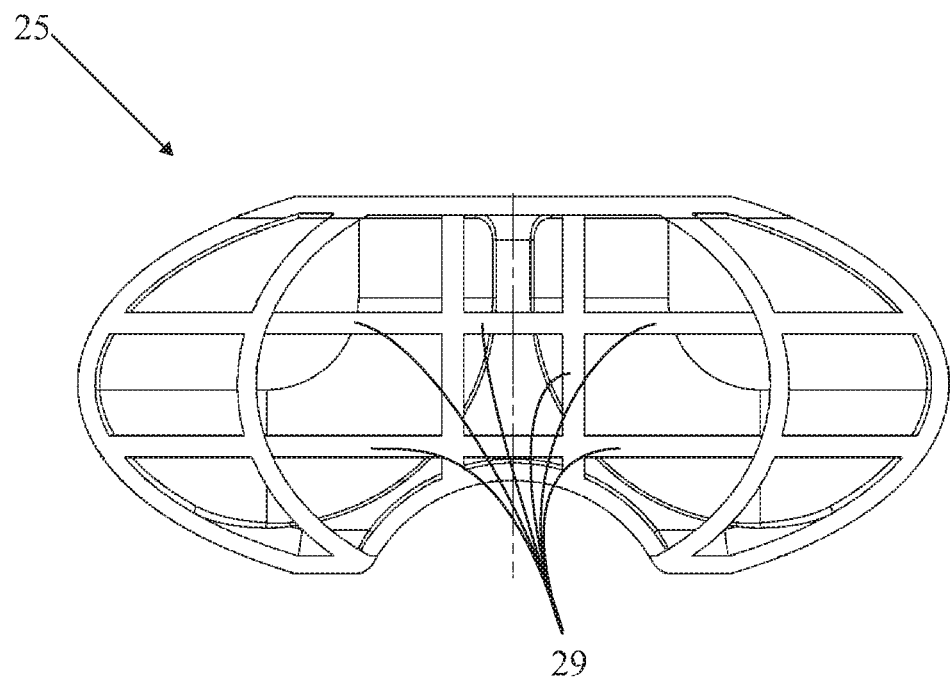
FIG. 8 is a rear view of the pressure attachment shown in FIG. 7.
Figure 9:
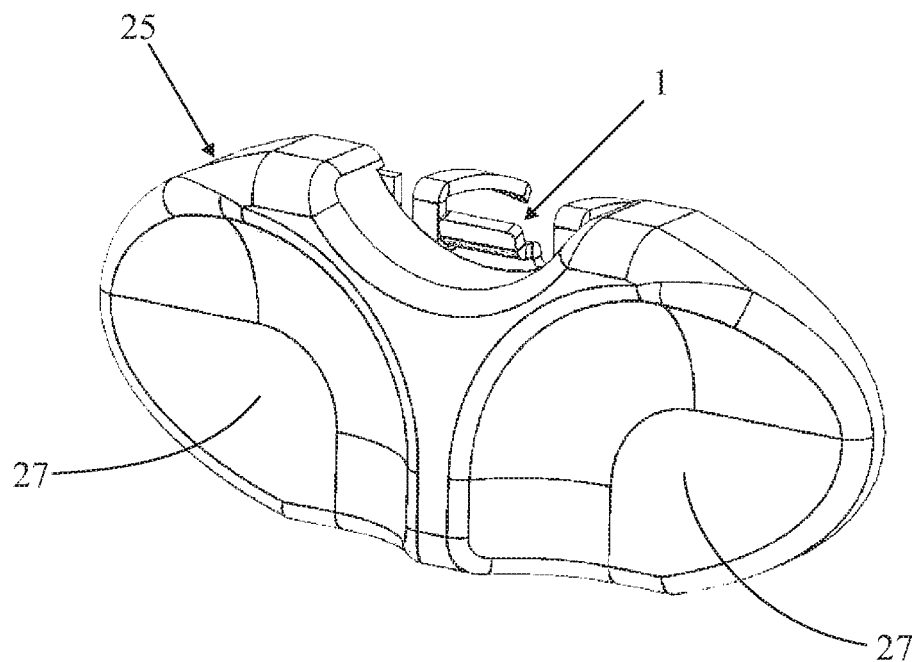
FIG. 9 shows the pressure attachment present on a mounting clip viewed from the front.
Figure 10:
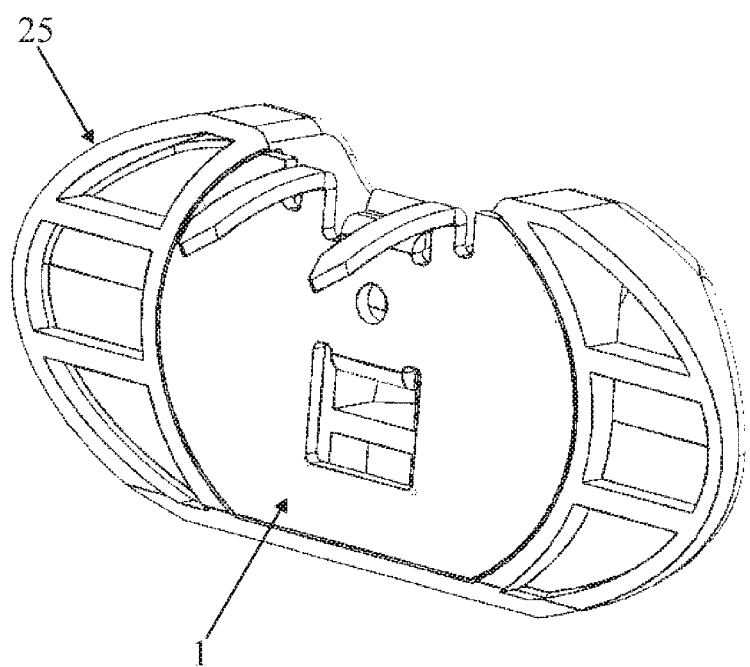
FIG. 10 shows the pressure attachment present on a mounting clip viewed from the rear.

FIGS. 7 and 8 show a pressing tool 25 for manually pressing the nails 19 of the mounting clips 1 into a wall. The pressing tool 25 can be placed on the mounting clip 1 and is provided with contact ribs 29 on the side facing the mounting clip. During pressing the nails of the mounting clip 1 in a wall the contact ribs 29 are in contact with the pressing surfaces 9b of the mounting clip 1. On the side remote from the mounting clip, the pressing tool 25 is provided with two further pressing surfaces 27 which are larger than the pressing surfaces 9b of the mounting clip 1. These further pressing surfaces 27 are hollow curved surfaces so that the pressing tool 25 can be pressed firmly with the thumbs.

Although the present invention is elucidated above on the basis of the given drawings, it should be noted that this invention is not limited whatsoever to the embodiments shown in the drawings. The invention also extends to all embodiments deviating from the embodiments shown in the drawings within the scope of the invention defined by the appended claims.

The invention claimed is:

1. Hanging system comprising at least two mounting clips (1) for mounting against a wall, as well as a hanging rail (3) which can be coupled to the mounting clips, said mounting clips each having a rear side (7) with which the mounting clips are in contact with the wall during use, as well as a front side (9) which is opposite the rear side, which mounting clips are each provided with a lower cam and an upper cam (11, 13) protruding from the front side, which hanging rail (3) is provided with two spaced apart and opposite edge parts (15, 17) which can be hooked behind one of the lower and upper cams (11) of each mounting clip and can be clicked over the other one of the lower and upper cams (13) of each mounting clip or can be clicked over both cams, characterized in that the mounting clips (1) further each are provided with at least one nail (19) protruding at the rear side, which nail can be pressed into the wall, parts (9b) of the front side (9) of the mounting clips on either side of the nail (19) form pressing surfaces, and that the mounting clips (1) are each formed from a flat metal plate (5), the lower and upper cams (11, 13) and the nail (19) being formed by plate parts bent out of the plate (5), from the plate (5) to be mounted against the wall the lower cam (13) includes a first portion extending away from the upper cam (11) and a second portion running towards the upper cam (11), the second portion forms a guide for lower edge part (17) of the hanging rail (3) for guiding this edge part over the cam when the hanging rail clicks on the mounting clip.

2. The hanging system according to claim 1, characterized in that one of the cams (13) is provided with a sharp protrusion (13c) on a side remote from the other cam and near a portion of the cam attached to the plate (5), which protrusion (13c) is in contact with the lower edge part (17) of the hanging rail (3) when the hanging rail (3) is on the mounting clip to compensate for tolerances between the hanging rail and the mounting clips and to prevent the hanging rail from shifting relative to the mounting clips during use.

3. The hanging system according to claim 2, characterized in that the sharp protrusion (13c) is formed by a local punch of the plate part with a pointed tool.

4. The hanging system according to claim 1, characterized in that the hanging system comprises a pressing tool (25) which can be placed on the mounting clip (1) and is provided with contact parts (29) on the side facing the mounting clip (1), which contact parts (29) are in contact with the pressing surfaces (9b) of the mounting clip (1) and on the side remote from the mounting clip the pressing tool is provided with two further pressing surfaces (27) that are larger than the pressing surfaces (9b) of the mounting clip (1).

5. The hanging system according to claim 4, characterized in that the further pressing surfaces (27) of the pressing tool (25) are hollow curved surfaces.

6. The hanging system according to claim 1, characterized in that the pressing surfaces (9b) are flat and free from protrusions.

* * * * *